United States Patent [19]

Hamilton

[11] Patent Number: 4,519,348
[45] Date of Patent: May 28, 1985

[54] OIL PAN AND WINDAGE TRAY FOR HIGH PERFORMANCE ENGINES

[76] Inventor: Edward Hamilton, 1746 Todd Rd., Toms River, N.J. 08753

[21] Appl. No.: 487,071

[22] Filed: Apr. 21, 1983

[51] Int. Cl.³ .............................................. F16N 31/00
[52] U.S. Cl. .............. 123/195 C; 123/196 R; 184/106
[58] Field of Search ............ 123/195 R, 196 R, 196 S, 123/195 C, 198 E; 184/6 S, 106

[56] References Cited

U.S. PATENT DOCUMENTS

| | | | |
|---|---|---|---|
| 3,101,129 | 8/1963 | Hulten | 184/106 |
| 3,106,263 | 10/1963 | McKellar | 123/196 R |
| 4,270,497 | 6/1981 | Valerio | 123/195 C |

Primary Examiner—Craig R. Feinberg
Attorney, Agent, or Firm—Christie, Parker & Hale

[57] ABSTRACT

An oil pan and windage tray reduce friction loss by separating the oil collection volume of the pan from rotating engine components. A skimmer integral with the tray skims oil from rotating parts and channels oil thrown from the rotating parts into a side pouch of the pan for delivery to the pan collection volume. The skimmer and tray mount to the engine separately from the pan. An alternate embodiment of a dry sump pan has a removable partition between a side pouch and the rotating parts and a skimmer separate from the pan. Separating the skimmer from the pan permits easy adjustment of the space between the skimmer and the rotating parts of the engine without obstruction from the pan.

12 Claims, 10 Drawing Figures

OIL PAN AND WINDAGE TRAY FOR HIGH PERFORMANCE ENGINES

BACKGROUND OF THE INVENTION

The present invention relates to oil pans for reciprocating internal combustion engines, and, more in particular to an oil pan having a skimmer to reduce friction loss from oil contacting rotating parts of the engine.

Internal combustion engines use oil pans to collect and store oil as a source of oil for an oil pump that distributes it under pressure throughout the engine. The pans may be wet sump or dry sump, the former storing a larger volume of oil than the latter. The rotating parts of the engine, especially the crankshaft and connecting rod bearing caps, get excess oil on them. Centrifugal force throws this oil from the parts. The thrown oil, being uncontrolled, will cause splash from contact with the oil pan and oil already in the collection volume of the oil pan. The splashing oil thrown against the rotating crankshaft and rod assembly produces drag on the rotating assembly by this impact. The wind created by the rotating crank and rod assembly creates additional splash by contacting the oil in the collection volume of the oil pan. This additional splash also creates drag on the crank and rod assembly by impact. The loss associated with wind related splash is known as "windage loss" while that of thrown oil is referred to as "oil impact loss."0 The consequence of too much oil on rotating parts is more than mere friction. Oil on the rotating parts has a mass which must be accelerated during engine acceleration that reduces the acceleration.

While some splash may be desirable in a typical engine's lubrication, the uncontrolled splash is considerably in excess of that necessary for lubrication.

Oil impact loss has been reduced with oil pans equipped with a skimmer. In wet sump pans, windage loss has been reduced by a windage tray. The skimmer is located very close to the rotating parts and scrapes oil from the rotating parts and directs it into a side pouch for collection in the oil collection volume of the pan. The windage tray underlies the rotating parts of the engine and creates a barrier between these parts and the oil collection volume of the pan.

For best performance the skimmer should be spaced from proximate crankshaft counterweights and connecting rod bearing caps and cap fasteners by between about 0.03 inch to about 0.06 inch (0.076 centimeter to 0.152 centimeter). This requires adjustment of the spacing, typically by grinding.

Different engines have different geometries, even when the engines are from the same manufacturer and are of the same model; differences in geometry can result from differences in the radius of crankshaft counterweights and length of stroke.

Previous skimmer equipped oil pans have had the skimmer integral with the pans. The adjustment required to produce the desired spacing between the rotating parts required for installing the pan on the engine. The pan prevented seeing the spacing between the scraper and the rotating parts, and adjustment was done blind. The desired spacing between the skimmer and the rotating parts was often lacking. The length of time for fitting was typically great unless a fortuitous fitting occurred early.

SUMMARY OF THE INVENTION

The present invention has a skimmer that is separate from the oil pan and which mounts on the engine separate from the pan to permit adjustment of spacing without obstruction from the pan. In one form, the present invention provides an improved oil pan, windage tray, and skimmer that has the windage tray and skimmer mounted to the engine separate from the pan itself. Without the obstruction of the pan it is easy to perform the adjustments necessary to produce proper spacing between the skimmer and the crankshaft counterweights, crank throws, connecting rod bearing caps, and any bearing cap fasteners. After adjustment, the pan receives the windage tray with mounting flanges of the tray lying on mounting rails of the pan. The pan and windage tray connect to an engine block by bolts with the flanges of the tray sandwiched between the block and the pan rails. The skimmer is placed for scraping oil from the rotating components of the engine. Slots between the skimmer and the tray pass oil thrown from the rotating parts into the pan. The tray can be fitted to the crankcase and the engine rotated backwards to fit the skimmer to the engine, with the required spacing between the rotating parts; as previously stated, that spacing is from about 0.03 inch to about 0.06 inch.

In a specific form of this embodiment, the tray and skimmer are integral, and the skimmer is proximate to and depends from one of the mounting flanges faces opposite the direction of rotation of the rotating parts and toward the opposite mounting flange to intercept oil on the rotating parts. A web of the skimmer depends downwardly from the mounting flange toward a valley of the tray. A blade of the skimmer extends inwardly from the web towards the centerline of the tray and the bottom of the valley and actually removes oil from the rotating parts. The skimmer and the tray define a channel for exiting oil into a side pouch of the pan, and slots between the tray and the skimmer permit this passage. Preferably, the tray is continuous and uninterrupted. In some applications, however, a portion or all of the tray can be oil previous, which can be done by using expanded or perforated metal. It is also desirable to have the tray coated with wome anti-friction substance such as a flurocarbon sold under the trademark Teflon, a trademark of the E. I. duPont Company. Preferably the tray spans the entire pan, but it may have a cutout for an oil pump or oil pump pickup. The volume of the side pouch is preferably fairly large, for it has been found that a large side pouch removes oil most effectively and improves engine efficiency. It is preferred that the pouch be long and continuous, the entire length of the pan. This is not always possible because of accessory equipment such as starters and the volume of the pouch must be reduced adjacent the accessory space. As has been the practice with high performance oil pans, baffling is included to assure the presence of oil in a sump of the pan during acceleration and deceleration at the entrance to the oil pump.

An alternate embodiment of the invention is a skimmer with a dry sump oil pan. The skimmer mounts to an engine crankcase separately from the pan so that adjustment of the space to the rotating parts can be done unencumbered by the oil pan. A side pouch of the pan is separated from the rotating parts of the engine by a partition. The partition and skimmer can be integral with the two attaching to the balance of the pan or separate. When the skimmer is separate from the pan, the partition may be integrated with the pan. The partition may be oil pervious in whole or in part, as by using expanded or perforated metal in its construction.

These and other features, aspects and advantages of the present invention will become apparent from the following description, appended claims and drawings.

DESCRIPTION OF THE PREFERRED EMBODIMENTS

Figure 1:
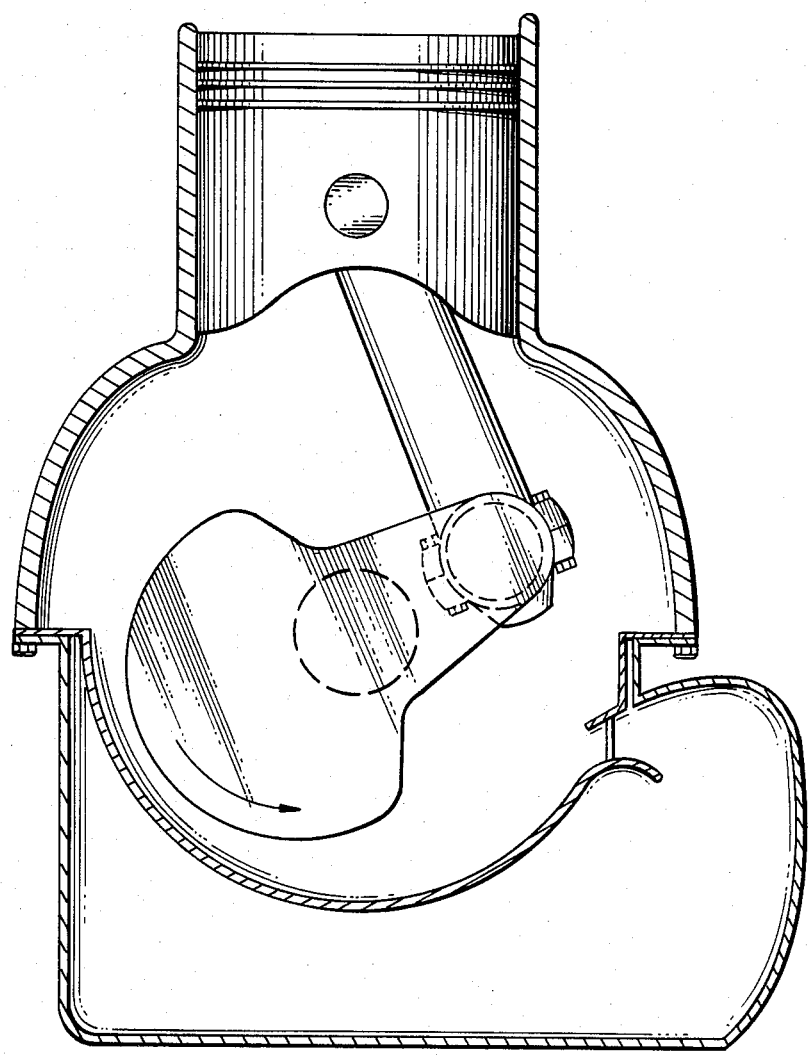
FIG. 1 is a schematic of a portion of an internal combustion engine illustrating in elevational cross section an improved pan, tray, and skimmer in accordance with the present invention, a crankshaft, connecting rod, and the pan mounted to a crankcase of the engine.

FIG. 1 illustrates the principles involved in the practice of the improved oil pan and skimmer of the present invention. In the FIGURE, an oil pan 10 and a windage tray and skimmer assembly 12 mount on a crankcase 13 of an internal combustion engine. The engine has a crankshaft 14, and it has crankshaft counterweights 16 and a crankshaft throw or connecting rod journal 18. A connecting rod 20 mounts on the connecting rod journal through journal bearings. The journal bearings are held in place by bearing caps 21, which in turn are held together by fasteners 22 that may or may not extend away from the caps. A piston 23 is connected to the connecting rod through a wrist pin 24. In FIG. 1 the view is taken from the rear of the engine forward and the engine rotates in this view counterclockwise. Pressurized lubrication of the engine lubricates the connecting rod journal and connecting rod journal bearings. The pressurized lubrication also lubricates components above the crankcase, such as a rocker arm assembly for the valve train of the engine. As the engine rotates, oil tends to cling to the rotating parts. Indeed, a quality of oil is this tendency to cling, the clinging producing better lubrication. The oil is thrown from the rotating components by centrifugal force. Without the windage tray, this oil splashes into oil in the pan and the oil in the pan will splash up and hit rotating components. Wind from the rotating parts also creates splash that hits the rotating parts. The splash produces substantial drag and requires a measurable amount of power to overcome, especially in high performance engines that have high engine revolution rates. The presence of a considerable amount of oil on an engine's rotating parts increases the inertia of those parts and reduces the rate at which the parts can accelerate one way or the other. This is undesirable as well. What is desired, then, is to have adequate bearing lubrication for the components of the engine without having that oil parasitically affecting the engine's performance.

As has been practiced in high performance applications for some time now, a windage tray and skimmer have been used to prevent oil splash back onto rotating components from oil thrown from the components and wind. The windage tray intercepts thrown oil and blocks the wind generated by the rotating parts, preventing splash. The skimmer removes oil and keeps it from being thrown up into the engine and splashing back onto the rotating parts. Oil thrown from the rotating parts of the engine is captured by the tray. Some of this oil has a component of inertia toward the exit slots between the skimmer and the tray, and will move toward the slots because of this inertia. Some of the oil will collect on the tray and move towards the slots from the impetus given to it by the rotating parts.

The skimmer and tray of the present invention accomplish these functions in an improved way.

Figure 2:
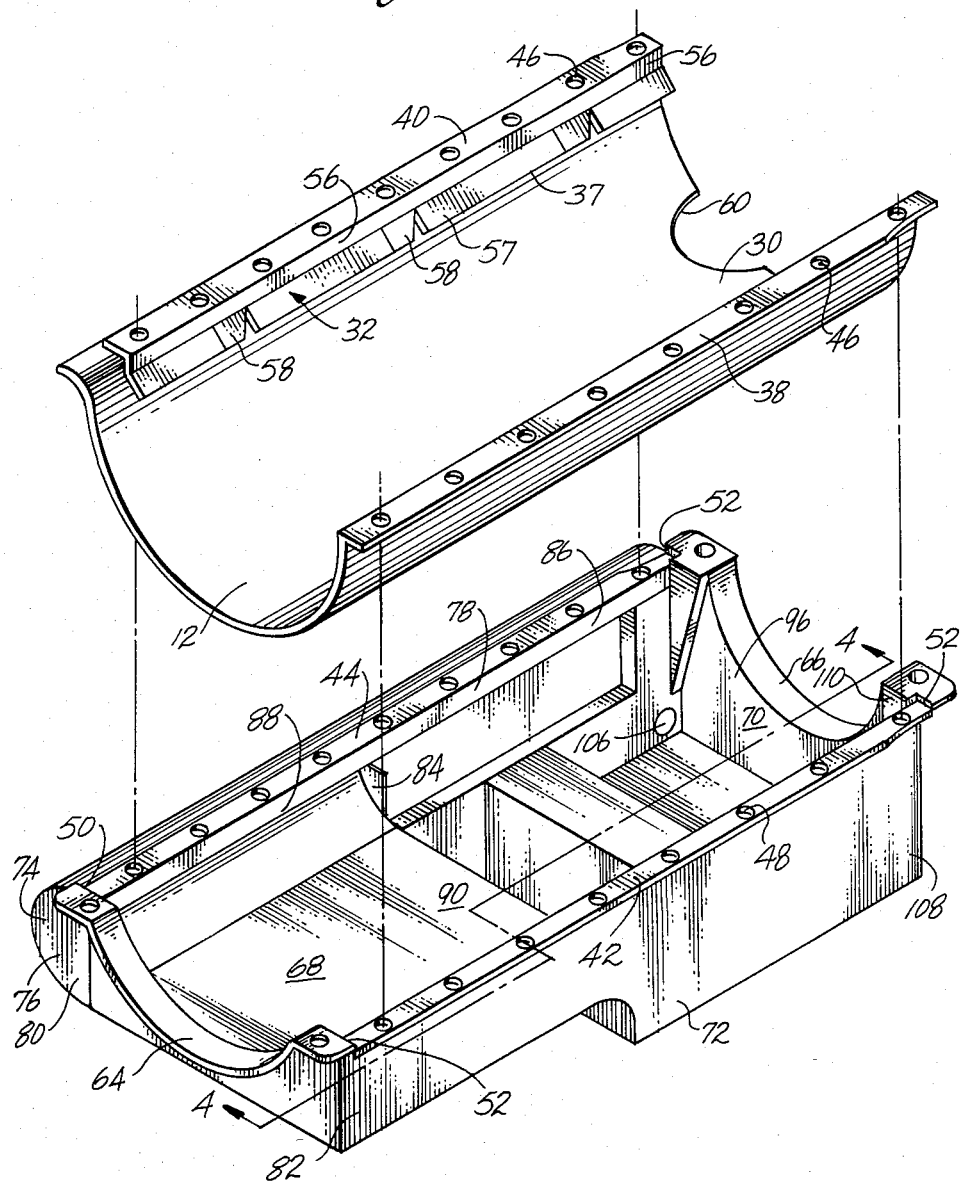
FIG. 2 is a perspective, exploded view of a pan, tray, and skimmer in accordance with a preferred form of the present invention looking from the front of the pan towards the rear.
Figure 3:
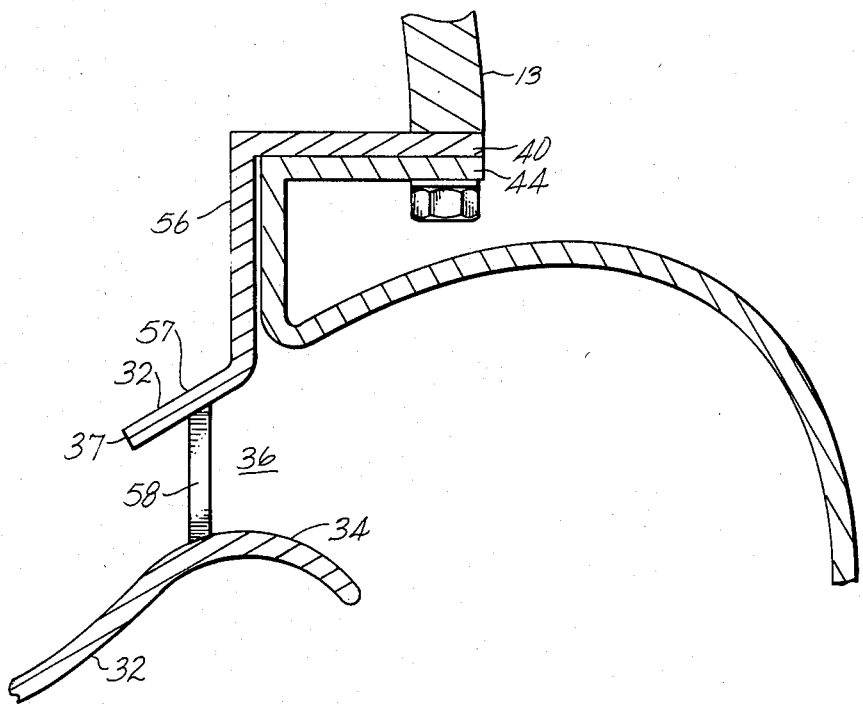
FIG. 3 is a fragmentary view in elevation of the skimmer and pan mounting to the crankcase of the engine.

With reference to FIGS. 2 and 3, tray and skimmer assembly 12 includes a tray proper 30 that extends underneath the crankcase from side-to-side and spans its length. A skimmer 32 is spaced above a lateral terminal lip 34 of the tray. Exit passages 36 in the form of slots between the skimmer and this terminus pass oil from the top side of the tray into the oil receiving volume of the pan. The slots are interiorly of a leading edge 37 of skimmer 32. The tray and skimmer have mounting flanges 38 and 40 extending the length of the crankcase coextensively with mounting rails 42 and 44 of the pan. Flanges 38 and 40 extend the entire length of the pan. The tray is circularly curved to form a valley and to clear the rotating parts of the engine, crankshaft counterweights, connecting rod journal bearing caps, and any fasteners used with the caps. Stated in different words, the tray has a concave upward curvature which may have a constant radius of curvature and the curvature provides clearance for the rotating engine parts. Mounting flanges 38 and 40 have a plurality of holes 46 for the passage of bolts. These holes register with complementary holes 48 in the pan mounting rails so that the holes are concentric and the mounting bolts pass through both sets of holes. The mounting rails end at steps 50 at the forward end of the pan and steps 52 at the rear end of the pan. The height of these steps corresponds to the thickness of mounting flanges 38 and 40 so that there is a continuous flat surface of the tray and pan combination with respect to the crankcase.

As can be seen best in FIGS. 1 and 3, a downwardly extending web 56 connects skimmer 32 and mounting flange 40. Web 56 extends the length of the tray and skimmer assembly. Skimmer 32 depends downwardly and inwardly from web 56. Web 56 and mounting flange 40 form a right angle and the skimmer through a blade 57 extends laterally inwardly toward the center of the pan from the end of the downwardly extending web. Leading edge 37 is on the blade.

Mounting tabs 58 are struck from the skimmer and are welded to the tray proper to connect the skimmer and the tray.

Slots 36 between these tabs and the tray pass oil into the pan. The slots are in the web behind leading edge 37 of the skimmer. The leading edge of the skimmer and lateral proximate terminal lip 34 of the tray are laterally spaced from one another and from the slots which are between them. At the rear end of tray 30, a cutout 60 accepts an in-place oil pump. In some applications, a cutout of this size will not be necessary, as with an external pump only an accommodation for an oil pickup will be necessary. The upper surface of the tray is preferably coated with Teflon.

The pan has a forward and a rear crescent 64 and 66, respectively, to accommodate crankshaft front and rear main bearing assemblies. A forechamber or forward volume 68 of the pan is shallower than a rear volume 70, the latter volume including a main sump 72. A side pouch 74 extends along one side of the pan facing slots 36 and receives the oil flung from the rotating parts. The slots and pouch face in the direction opposite the path of rotation to intercept thrown oil.

Figure 4:
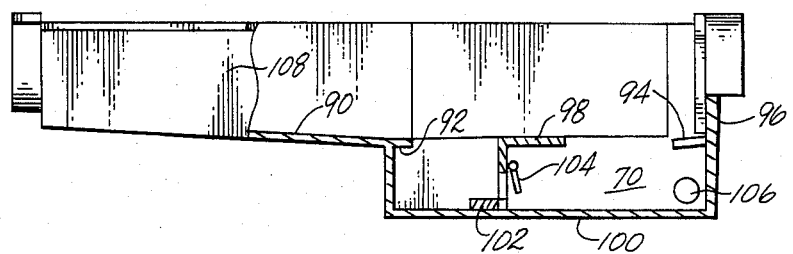
FIG. 4 is a view of the pan taken generally in the plane 4—4 of FIG. 2.

With reference to FIGS. 2 and 4 in the embodiment illustrated pouch 74 has two sections, a large volume, laterally deep section 76 and a small volume, laterally shallow section 78. Shallow section 78 provides a space laterally of it for a standard starter for the engine. Special starters can be provided so that the large pouch section can be extended, with efficacious results. Large volume 76 has an end wall 80 coplanar with a front end wall 82 of the pan. Large volume 76 terminates longitudinally at an end wall 84 that joins a lateral wall 86 of the small volume pouch. A lateral wall 88 of the large volume pouch is arcuate, and extends upwardly and forwardly to define an upper wall of the pouch. The lateral dimension of the pouch towards its top is greater than at its bottom because it is important to get oil out of the upper zone as fast as possible so that it will not back up and get onto rotating engine parts.

The forward volume of the pan has a floor 90. Floor 90 extends as a lip 92 over the front part of sump 70. This lip acts as a baffle to restrain oil surges in the sump during vehicle deceleration and assure the presence of oil at the oil pump inlet. A rear baffle 94 that extends from a rear wall 96 of the pan provides the same function during acceleration. A trap door bracket 98 also serves as a surge baffle and mounts a trap door 104 that opens only in the direction indicated in FIG. 4 because it interferes with material of the bracket bounding the trap door in the opposite direction. The trap door traps oil in the rear volume of the sump during deceleration of a vehicle and passes oil from this volume during acceleration. The trap door bracket mounts to floor 100 as by welding a flange of the bracket 102 to the floor. A standard drain plug 106 is for draining oil from the pan. The pan has a closing side 108 opposite the closure effected by the walls of pouches.

Figure 5:
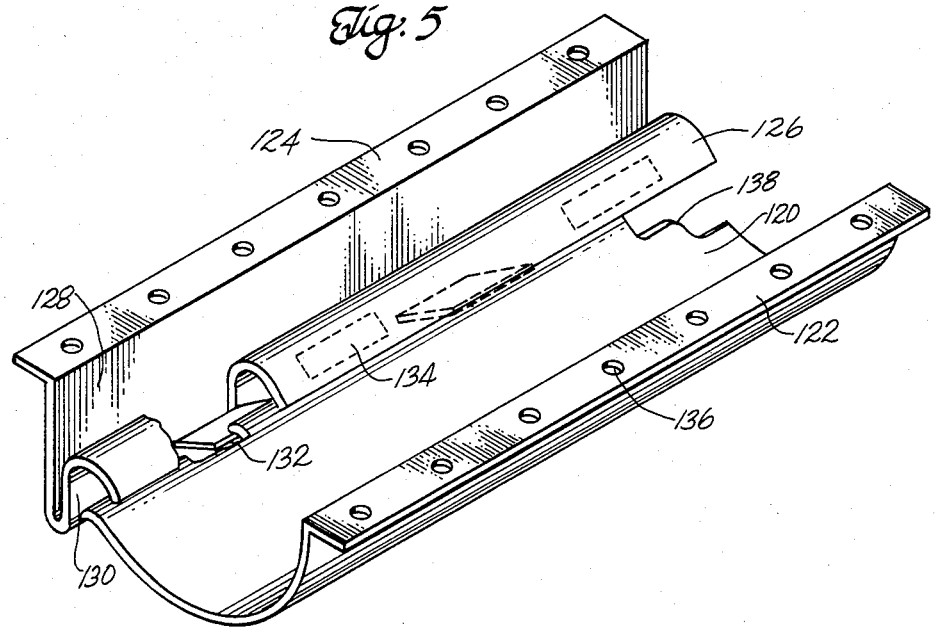
FIG. 5 is a perspective view of an alternate tray and skimmer of the invention.
Figure 6:
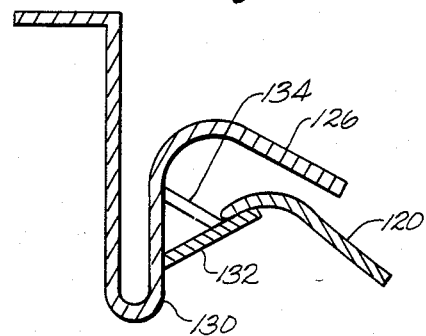
FIG. 6 is a fragmentary view of the tray and skimmer of FIG. 5 taken in the area of 6—6.

FIG. 5 illustrates an alternative form of the skimmer and tray of the present invention. A tray 120 forms a valley separating the oil collection volumes of a pan from the rotating parts of the engine. The tray has a first mounting flange 122 and a second mounting flange 124 to mount the tray and skimmer to a crankcase with the mounting rails of the pan sandwiching the mounting flanges between the crankcase and the pan. A skimmer 126 faces rotating engine parts to intercept and scrape off oil from the parts. The skimmer is integral with flange 124 and tray 120.

In greater particular, a vertical wall 128 depends downwardly from flange 124 and is bent back upon itself to define a reentrant wall 130. A blade 131 of skimmer is formed from bending wall 130 downwardly and inwardly towards the center of the tray. Webs 132 connect wall 130 with tray 120. These webs occur periodically along the length of the skimmer. Additional webs 134 connect the skimmer to the tray. A plurality of mounting holes 136 in the mounting flanges receive mounting bolts. The upper surface of the tray is preferably Teflon-coated. A cutout 138 is for an in-place oil pump. The oil scraped by skimmer 126 enters a channel 140 and passes into the oil collection volumes of the pan through passages between the webs. This tray and skimmer can be used with a pan that does not have steps to receive the mounting flanges. The pan gasket is not used in areas corresponding to the mounting flanges. After the pan, tray and skimmer are mounted to an engine a silicon seal around the entire joint prevents leaks.

Figure 7:
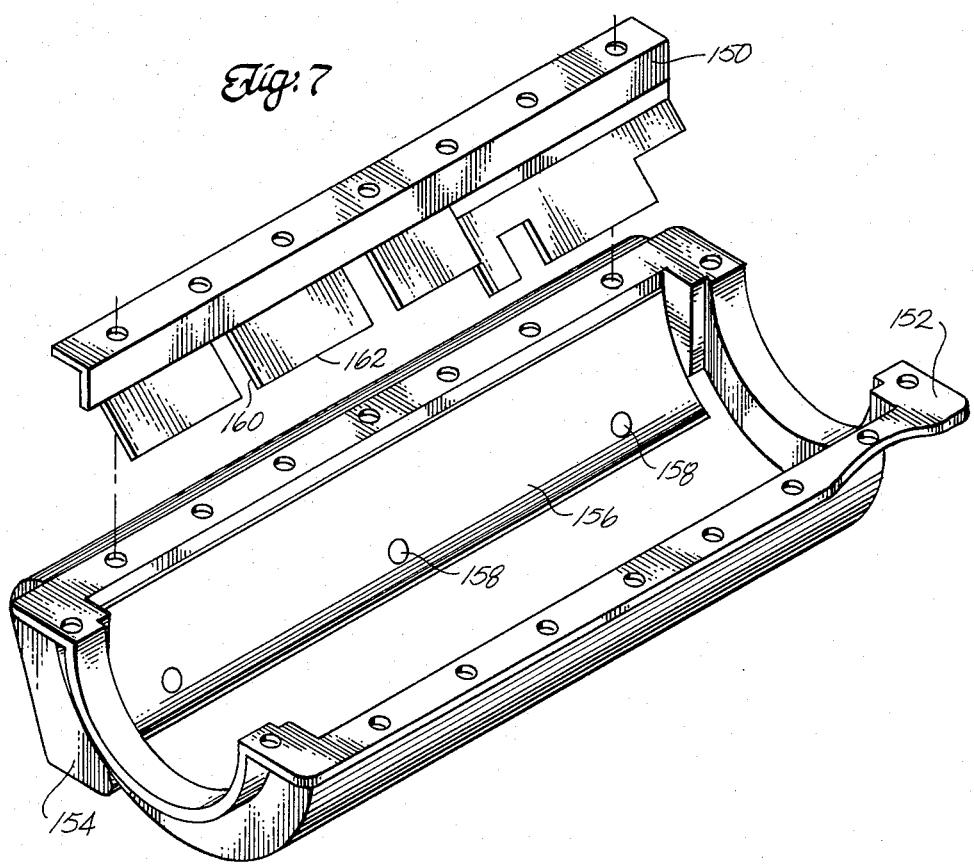
FIG. 7 is a perspective, exploded view of a skimmer and dry sump pan in accordance with an alternate embodiment of the invention.
Figure 8:
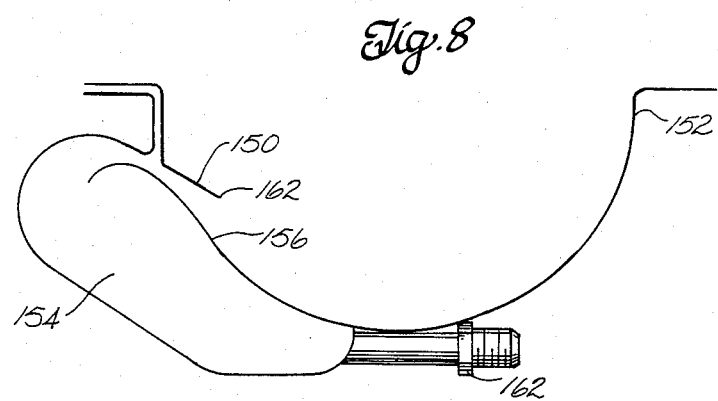
FIG. 8 is an elevational, sectional view of the skimmer and pan of the FIG. 7 embodiment.

The present invention also contemplates a skimmer for use with a dry sump pan. Such an arrangement is shown in FIG. 7. There, a skimmer 150 and a dry sump oil pan 152 cooperate to remove excess oil from rotating parts and to prevent splash of oil back onto these parts in much the same manner as in the wet sump pan described earlier in the specification. As can be seen in FIGS. 7 and 8, skimmer 150 and pan 150 have a relationship much the same as in the wet sump. A side pouch 154 has a removable partition 156 at its inner wall and the bottom part of the channel through which oil passes for pickup by an external oil pump. Partition 156 may be mounted to the pan by a plurality of regularly spaced fasteners, such as button head screws between the partition and the pan.

As can be seen in FIG. 8, a pickup tube 162 extends into the bottom of pouch 154 to pick up oil for circulation by the external oil pump.

Usually there are two of these pickup tubes. As in the previously described embodiments, it is preferred to coat the upper surface of the pan with Teflon so that oil does not cling to the surface.

By providing a partition that is removable it is easy to clean the sump and pickup tubes.

The skimmer is separate from the pan and does not include a tray as such. But its mounting separately from the pan for adjusting the space between the scraping portions of the skimmer and the rotating parts of the engine is still present. Gaps 160 in the skimmer accommodate engine main bearing caps. The skimmer has a leading edge 162 of a blade which faces downwardly and inwardly towards the rotational path of the rotating parts.

Figure 9:
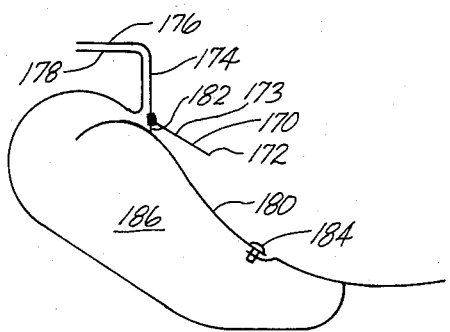
FIG. 9 is an elevational, fragmentary view of an alternate dry sump embodiment of the invention.
Figure 10:
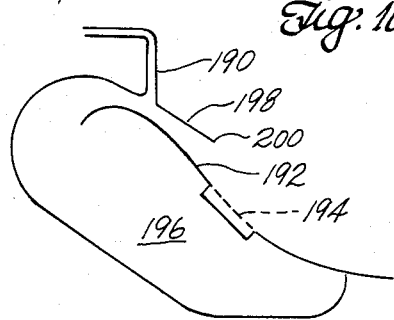
FIG. 10 is an elevational, fragmentary view of another alternate dry sump embodiment of the invention.

FIGS. 9 and 10 show alternative arrangements for dry sump skimmers and pans made in accordance with the present invention. In FIG. 9, a skimmer 170 includes a leading edge 172 on a blade 173 that angles downwardly and inwardly towards the path of rotation of rotating engine parts. Vertical web 174 is secured to this portion and a mounting flange 176 extends at right angles to overlie pan mounting rail 178 and for mounting of the pan and skimmer to the crankcase of an engine. A partition 180 connects to the skimmer through regularly spaced webs 182, and the skimmer and the partition are removable. The partition attaches to the pan as by fasteners 184. The pouch of pan 186 receives oil channeled between the skimmer and the partition for pickup by an external oil pump in the manner described with reference to FIG. 7.

FIG. 10 has a skimmer 190 separate from a partition 192. The partition has regularly spaced windows 194 of expanded or perforated metal to pass oil directly into a pouch 196. The channel between skimmer and pouch has the same geometry as before. The skimmer has a downwardly and inwardly extending blade 198 with a leading edge 200. The leading edge scrapes oil from rotating parts, and the blade defines with an adjacent portion of partition 192 a channel for this oil to flow into pouch 196.

The present invention has been described with reference to certain preferred embodiments. The spirit and scope of the appended claims should not, however, necessarily be limited to the foregoing description.

What is claimed is:

1. An improved tray and skimmer for an internal combustion engine that has rotating components, a crankcase housing at least some of the components, a crankcase housing at least some of the components, a lubrication system for supplying oil to the components, and an oil pan, the tray and skimmer comprising:
    (a) a pair of longitudinally extending mounting flanges of a length substantially equal to longitudinally extending surfaces of the crankcase of the engine against which the pan mounts, the mounting flanges having means for mounting the tray and skimmer to the crankcase along the longitudinal surfaces of the crankcase and sandwiched between the crankcase and the pan;
    (b) the skimmer extending longitudinally proximate one of the mounting flanges and on the side of the tray that will face opposite the direction of rotation of the engine's rotating components, the skimmer being adapted to scrape oil from the rotating components and for the adjustment of the clearance between it and the rotating components;
    (c) the tray and one of the mounting flanges being physically connected together via a wall means with the tray and skimmer underlying the mounting flanges with the skimmer being in position for directing oil flung from rotating components of the engine towards the skimmer and for preventing oil in the pan from splashing up onto the rotating components;
    (d) passage means through said wall means located between the tray and the skimmer to pass oil from the rotating components into the pan; and
    (e) the tray and skimmer being physically separate from the pan so that the clearance between the skimmer and the rotating components can be adjusted without the pan being mounted to the crankcase and blocking visual observation of the clearance.

2. The improved tray and skimmer claimed in claim 1 wherein:
    (a) the tray is concave upward with a generally circular curvature;
    (b) a vertically extending web forming said wall means connects the skimmer and the mounting flange the skimmer is most proximate to, the passage means being defined by slots formed in the web;
    (c) the mounting means includes holes spaced for registration with holes in the pan;
    (d) the mounting flanges are coplanar and parallel;
    (e) the skimmer is parallel to the mounting flanges; and
    (f) the slots are inwardly of the leading edge of the skimmer and the proximate terminus of the tray.

3. The improved tray and skimmer claimed in claim 1 wherein the mounting means includes a plurality of holes for male fasteners.

4. The improved tray and skimmer claimed in claim 3 wherein the mounting flanges are generally parallel and coplanar, and the skimmer parallels the mounting flanges and depends downwardly and inwardly towards the center of the tray from the one of them.

5. The improved tray and skimmer claimed in claim 4 wherein the tray has a lip underlying the skimmer and extending outwardly from the passage means towards the proximate lateral outside of the tray, the skimmer extending laterally inward towards the center of the tray from the passage means and overlying the lip of the tray so that the passage means is between the termini of the lip and the skimmer.

6. The improved tray and skimmer claimed in claim 4 wherein said web comprises a vertical web connecting the one of the mounting flanges proximate the skimmer with the skimmer.

7. An improvement claimed in claim 1 including an oil pan, wherein:
    (a) the oil pan has an oil collection volume to contain oil for lubrication of the engine and a pair of mounting rails along each of its sides for mounting the pan to a crankcase of the engine; and
    (b) the mounting flanges of the tray and skimmer adapted to overlie the mounting rails of the pan and to be sandwiched between the pan and the crankcase.

8. The improvement claimed in claim 1 wherein:
    (a) the wall means is a web which connects one of the mounting flanges to the skimmer; and
    (b) the passage means to pass oil includes slots through the web between the skimmer and the tray.

9. The improvement claimed in claim 8 wherein the tray is circularly curved concave upward.

10. The improvement claimed in claim 8 wherein the mounting flanges are coplanar, the mounting rails are coplanar, and both extend the length of the pan.

11. The improvement claimed in claim 8 wherein the web is intermediate the proximate lateral terminus of the tray and the leading edge of the skimmer.

12. The improvement claimed in claim 11 wherein the tray is circularly curved concave upward.

* * * * *

UNITED STATES PATENT AND TRADEMARK OFFICE
CERTIFICATE OF CORRECTION

PATENT NO. : 4,519,348
DATED : 28 May 1985
INVENTOR(S) : Edward Hamilton

It is certified that error appears in the above-identified patent and that said Letters Patent is hereby corrected as shown below:

IN THE SPECIFICATION

| | |
|---|---|
| Column 1, line 31 | After the quotation mark delete "0" |
| Column 2, line 42 | Change "previous" to -- pervious -- |
| Column 2, line 44 | Change "wome" to -- some -- |
| Column 3, line 5 | After "become" insert -- more -- |
| Column 6, line 22 | Change "pan 150" to -- pan 152 -- |

IN THE CLAIMS

| | |
|---|---|
| Column 7, line 14 | Delete "crankcase housing at least some of the components, a" |

Signed and Sealed this

Fourteenth Day of April, 1987

Attest:

DONALD J. QUIGG

Attesting Officer

Commissioner of Patents and Trademarks